United States Patent [19]
Levrai

[11] Patent Number: 6,116,141
[45] Date of Patent: Sep. 12, 2000

[54] PNEUMATIC BRAKE BOOSTER WITH CONTROL CHAMBER

[75] Inventor: Roland Levrai, Stains, France

[73] Assignee: Bosch Systemes de Freinage, Draney, France

[21] Appl. No.: 09/117,303

[22] PCT Filed: Jul. 16, 1998

[86] PCT No.: PCT/FR98/01551

§ 371 Date: Jul. 24, 1998

§ 102(e) Date: Jul. 24, 1998

[87] PCT Pub. No.: WO99/06257

PCT Pub. Date: Feb. 11, 1999

[30] Foreign Application Priority Data

Jul. 31, 1997 [FR] France ................................ 97 09740

[51] Int. Cl.$^7$ ...................................................... F15B 9/10
[52] U.S. Cl. ...................... 91/170 R; 91/376 R; 91/530; 92/64
[58] Field of Search ............................. 91/170 R, 376 R, 91/525, 530; 92/62, 64, 65

[56] References Cited

U.S. PATENT DOCUMENTS

| | | |
|---|---|---|
| 4,667,471 | 5/1987 | Fulmer et al. . |
| 4,893,691 | 1/1990 | Park .......................................... 180/169 |
| 5,098,170 | 3/1992 | Watanabe ................................ 188/356 |

FOREIGN PATENT DOCUMENTS

| | | |
|---|---|---|
| 171585 | 2/1986 | European Pat. Off. . |
| 4004249 | 2/1986 | Germany . |

*Primary Examiner*—F. Daniel Lopez
*Attorney, Agent, or Firm*—Leo H. McCormick, Jr.; Warren Comstock

[57] ABSTRACT

A pneumatic brake booster having a right casing (10) divided in a leaktight fashion by a first moving partition (12) into a front chamber (14) and a rear chamber (16). The front chamber (14) being permanently connected to a source of low pressure (V) with the rear chamber (16) being selectively connected to the front chamber (12) and as source of high pressure by a three-way valve (40) operated by an operating rod (34). A three-way and two position solenoid valve (68) has a first inlet connected to the source of low pressure (V), a second inlet connected to a source of high pressure (A) and outlet connected to the rear chamber (14). A second moving partition (54,54') divides the rear chamber (14) into a working chamber (16) and a control chamber (50,50') with the outlet of the solenoid valve (68) being connected to the control chamber (50,50'). A pneumatic piston (20) which passes in leaktight sliding through the second moving partition (54,54') has a stop (72) which engages and moves the second moving partition (54,54') when the pneumatic piston (20) moves in a forward direction. The second moving partition (54,54') independently moving into engagement with the first moving partition (12) in response to output from the solenoid valve (68) to develop an output force and effect a brake application.

3 Claims, 1 Drawing Sheet

PNEUMATIC BRAKE BOOSTER WITH CONTROL CHAMBER

The present invention relates to pneumatic boosters, and more particularly the pneumatic boosters used to boost braking in motor vehicles.

BACKGROUND OF THE INVENTION

Such boosters are well known in the art and generally comprise a casing divided in leaktight fashion by at least one moving partition structure into at least one front chamber permanently connected to a source of low pressure, and at least one rear chamber selectively connected to the front chamber or to a source of high pressure by a three-way valve means, the valve being operated by an operating rod.

The purpose of such an arrangement is to create a pressure difference across the two faces of the moving partition so as to generate on a push rod, which, for example, operates a master cylinder controlling the hydraulic pressure in the wheel cylinders of the vehicle, a boost force which adds to the operating force exerted by the driver of the vehicle on the brake pedal.

Some years ago devices were developed which made it possible to control the action of the brakes even when the driver of the vehicle was not depressing the brake pedal. Such automatic braking actions may be triggered by one or more detectors of operating parameters or parameters of the attitude of the vehicle, for example to prevent wheel-spin on vehicle acceleration, to help the driver of the vehicle to pull away on an incline, or under the control of a device of the anti-collision radar type.

Systems of this type, combined with pneumatic boosters, are described, for example, in documents EP-A-0,171,585, EP-A-0,303,470, and EP-A-0,347,583. The solutions illustrated in these documents have a number of drawbacks. Firstly, they require either an appreciable modification to the moving partition which separates the front chamber from the rear chamber, and especially to the central part of this moving partition, compared with the conventional configuration, or a completely special piston to allow atmospheric pressure to be applied directly in the rear chamber for operation in automatic braking mode.

Furthermore, during operation in automatic braking mode, the booster response time is relatively long because of significant pressure drops in the flow of air through the control solenoid valve, the central or offset air-transfer boot, the supply ducts formed in the pneumatic piston, and finally, the relatively narrow valve passage in the three-way valve. These same pressure drops are encountered in the opposite direction at the end of the automatic-braking operation, during what is conventionally known as brake release, and they can be significant enough that they cause the driver some annoyance.

Furthermore, the air-transfer boot, and more specifically its central part, is alternately pressurized/evacuated at the same time as being compressed/stretched. This repeated pressing causes rapid wear of the boot, and therefore detracts from its longevity and from the reliability of the booster.

Finally, operation in automatic braking mode is very difficult, sometimes even impossible, to obtain if the booster is not in its position of rest, that is to say if the driver of the vehicle is in the process of pressing the brake pedal.

SUMMARY OF THE INVENTION

The present invention falls within this context, and its purpose is to provide a pneumatic booster which makes operation in automatic braking mode possible irrespective of whether or not the booster is in the position of rest, and entails only a minimum number of modifications to a conventional booster so that the maximum possible number of its various components can be used without them having to be re-designed and so that the performance of the booster is not adversely affected by these modifications, and in which the response time during operation in automatic braking mode or upon brake release following automatic braking is reduced to a minimum value, it being essential that the booster be reliable in all circumstances.

The present invention therefore proposes a pneumatic brake-booster comprising a rigid casing which has a rear wall and a front wall and is divided in leaktight fashion by at least a first moving partition structure into at least a front chamber permanently connected to a source of low pressure and at least one rear chamber connected selectively to the front chamber or to a source of high pressure by a three-way valve means, this valve being operated by an operating rod secured to a plunger, the moving partition structure being secured to a pneumatic piston capable of sliding in leaktight fashion in an opening in the rear wall of the casing of the booster, the three-way valve means controlling the communication between a first passage connected to the front chamber, a second passage connected to the rear chamber, and the source of high pressure, the first passage and the second passage both being formed in the pneumatic piston, a three-way, two-position solenoid valve having a first inlet connected to the source of low pressure, a second inlet connected to the source of high pressure and an outlet connected to the rear chamber of the booster.

According to the invention, the booster has a second moving partition structure arranged between the first moving partition structure and the rear wall, independent of the first moving partition structure, and dividing the rear chamber into a working chamber delimited by the first moving partition structure and second moving partition structure and a control chamber delimited by the second moving partition structure and the rear wall, the first passage of the pneumatic piston opens into the front chamber and the second passage opens into the working chamber, while the outlet of the solenoid valve is connected to a duct opening into the control chamber, the pneumatic piston passes with a leaktight sliding through the second moving partition structure so that it can slide freely with respect to it, and the pneumatic piston has a stop against which the second moving partition structure can rest so as to carry the pneumatic piston along with it when it is urged forwards.

It will therefore be understood that thanks to this arrangement a chamber for controlling the booster is obtained which is independent of the working chamber of this booster, and in which the pressure can be controlled, using the solenoid valve, and change very quickly so as to obtain operation in automatic braking mode with a minimum response time, operation in manual braking mode maintaining all of its features.

According to a first embodiment, the second moving partition structure comprises a rigid disc associated with a flexible rolling membrane, an outer peripheral bead of which is fixed in leaktight fashion to the outer casing of the booster.

As a preference, the outer peripheral bead is held in leaktight fashion in crimping between the rear wall of the casing of the booster and a more or less cylindrical lateral intermediate casing portion.

Provision may then be made for the intermediate portion to be itself crimped to the front wall of the booster casing.

When the first moving partition structure comprises a rigid disc associated with a second flexible rolling membrane, an outer peripheral bead of which is fixed in leaktight fashion to the outer casing of the booster, provision may advantageously be made for the outer peripheral beads of the rolling membranes associated with the first moving partition structure and with the second moving partition structure to be held by an intermediate component of appropriate shape, this intermediate component being secured to the front wall and rear wall of the booster casing.

According to a second embodiment, the second moving partition structure comprises a rigid disc of small diameter and a deformable annular membrane mounted on the rigid disc, and this annular membrane can be deformed elastically between a first configuration, that it adopts at rest when the output of the solenoid valve is connected to the source of low pressure, and a second configuration that it adopts when the outlet of the solenoid valve allows the control chamber and the source of high pressure to communicate, and in which position it comes to rest against the first moving partition structure.

As a preference, the deformable annular membrane is equipped on its outer periphery with an annular lip capable of interacting in leaktight fashion with the rear wall of the casing when it is in its first configuration, and with the first moving partition structure when it is in its second configuration.

Provision may, for example, be made for the diameter of the rigid disc of the second moving partition structure to be equal to approximately half the diameter of the first moving partition structure.

Other objects, features and advantages of the present invention will become clearer from reading the description which follows of one embodiment of the invention given, by way of non-limiting example, with reference to the appended drawing.

BRIEF DESCRIPTION OF THE DRAWINGS

The single FIGURE represents a view in transverse section of a pneumatic booster produced in accordance with the present invention, the upper and lower halves of this FIGURE illustrating two alternative forms of the invention.

DETAILED DESCRIPTION OF THE INVENTION

Figure 1:
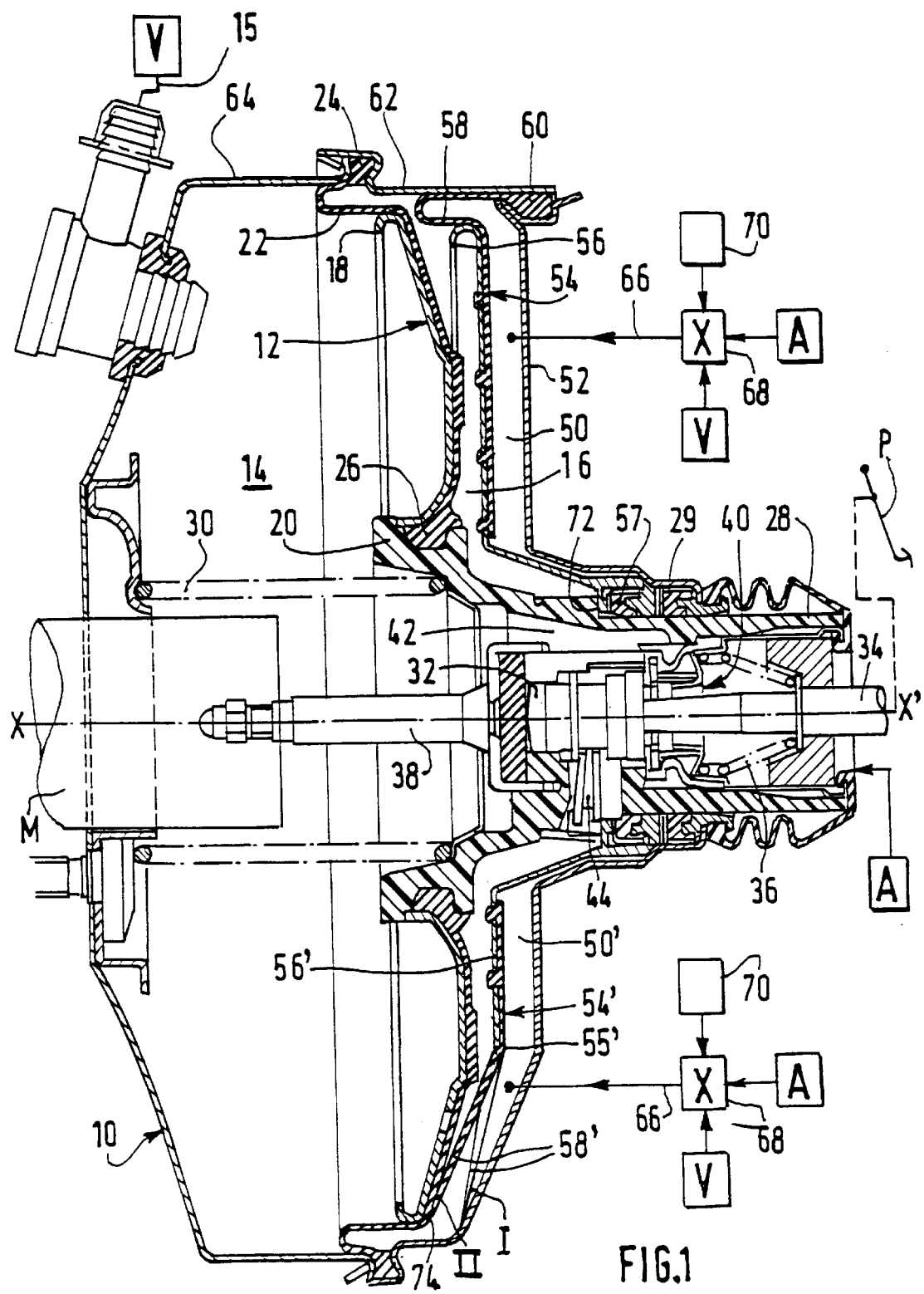

The single FIGURE represents a sectional view through a pneumatic brake-booster designed to be placed, in the conventional way, between the brake pedal P of a vehicle and the master cylinder M controlling the pressure in the hydraulic braking circuit of this vehicle.

By convention, that part of a booster which points towards the master cylinder M is called "front" and that part of the booster which points towards the brake pedal P is called "rear". In the FIGURE, the front is therefore to the left and the rear to the right.

The booster depicted in the FIGURE comprises an outer casing 10 in the form of a shell, which has symmetry of revolution about an axis X–X'. A moving partition structure 12 delimits within the casing 10, a front chamber 14 permanently connected to a source of partial vacuum by a pipe 15, and a rear chamber 16. The moving partition 12 constitutes a boost piston which comprises a rigid skirt 18 secured to a pneumatic piston 20.

The skirt 18 is associated with a flexible rolling membrane 22, for example made of elastomer, the outer peripheral edge of which is held in leaktight fashion thanks to a bead 24 on the outer casing 10. The membrane 22 may be of annular shape and bonded by its inner peripheral edge to the rear face of the skirt 18, or, as has been depicted, be of circular shape and have an inner bead 26 held in leaktight fashion in a peripheral groove of the pneumatic piston 20.

The pneumatic piston 20 is extended towards the rear in the form of a tubular part 28 which passes in leaktight fashion through the rear wall of the casing 10 thanks to an annular seal 29. A compression spring 30 inserted between the moving partition 12 and the internal face of the front part of the casing 10 normally keeps the piston 20 in the rear position of rest illustrated in the FIGURE, in which position the rear chamber 16 has its minimum volume and the front chamber 14 its maximum volume.

A plunger 32 is slideably received by its front end in a bore, possibly a stepped bore, formed in the central part of the pneumatic piston 20. The front end of a rod 34 for operating the booster, which rod is also arranged on the axis X–X', is mounted in the manner of a ball joint in a blind bore of the plunger 32. The rear end of the operating rod 34 is operated directly by the brake pedal P of the vehicle, and is returned to its position of rest by a return spring 36 resting against the inside of the tubular part 28.

In a known way, the plunger 32 car operate a three-way valve means 40, which selectively connects the rear chamber 16 either to the front chamber 14 via a duct 42 or to the annular space around the operating rod 34, via a duct 44.

In the position of rest illustrated in the FIGURE, the front chamber 14 is communicating, on the one hand, with the source of partial vacuum V via the pipe 15 and, on the other hand, with the rear chamber 16 via the valve means 40, which is then allowing this communication. As the same pressure is exerted on both faces of the moving partition 12, the latter experiences only the force exerted by the spring 30 and occupies the rear position of rest depicted in the FIGURE.

In the conventional way, when the driver of the vehicle depresses the brake pedal, the operating rod 34 operates the three-way valve means 40 for first of all breaking the communication between the front chamber 14 and the rear chamber 16, then making the annular space, where atmospheric pressure A prevails, around the operating rod 34 communicate with the rear chamber 16, thus creating a pressure difference across the moving partition 12, resulting in a boost force proportional to the input force exerted on the brake pedal P, these forces being applied together to a push rod 38 to operate the piston of the master cylinder M.

The fact that an automatic braking device is added to the pneumatic brake-booster means that means of causing the moving partition 12, and therefore the push rod 38, to move forwards without the operating rod 34 being acted upon by deliberate action by the driver of the vehicle, are added to the system just described.

For this, in accordance with the present invention, the booster is equipped with a third chamber, or control chamber, to fulfil this function.

According to the first alternative form depicted in the upper half of the single FIGURE, the control chamber 50 is defined between the rear wall 52 of the booster casing 10 and a second moving partition 54. The second moving partition 54 comprises a rigid disc 56 capable of sliding in leaktight fashion thanks to an annular seal 57, on the rear tubular part 28 of the pneumatic piston 20, this rigid disc 56 being associated with a second flexible rolling membrane 58, an outer peripheral bead 60 of which is fixed in leaktight fashion to the outer casing 10.

As has been depicted in the upper half of the single FIGURE, provision may advantageously be made for the bead 60 to be held in crimping between the rear wall 52 of the casing 10 and a more or less cylindrical intermediate portion 62 of the side wall of the booster, this intermediate portion 62 being itself crimped to the front wall 64 of the booster casing so as to hold the bead 24 of the first flexible membrane 22.

Provision may also be made for the two beads 24 and 60 both to be held by an intermediate component of appropriate shape, this component being secured, for example by crimping, to the front wall 64 and to the rear wall 52 of the booster casing 10.

The moving partition 54 thus divides the rear chamber of the booster into a working chamber 16 delimited between the two moving partitions 12 and 54, and into which the radial duct 44 opens, and a control chamber 50, delimited by the second moving partition and the rear wall 52 of the booster, and isolated in leaktight fashion from the front chamber 14 and the working chamber 16 of the booster.

The control chamber 50 is connected by an external duct 66 to a two-position, three-way solenoid valve 68, the position of which is controlled by the signal delivered by an assembly 70 that detects operating or attitude parameters of the vehicle which need to bring about operation in automatic braking mode. The various possibilities and various types of sensor are described in detail in the aforementioned prior art. All that need be mentioned here is that when automatic braking needs to be commanded, the solenoid valve 68 makes the duct 66 communicate with atmospheric pressure A, whereas during all other operating phases, the solenoid valve 68 makes the duct 66 communicate with the source of partial vacuum V, which may advantageously be the same as the one connected to the pipe 15, and which may, for example, be tapped from the vehicle engine inlet tract or be provided by a vacuum pump.

The way in which the booster which has just been described works will be readily understood. During normal operating phases, that is to say when the automatic braking command is not active, the third chamber 50 is kept permanently at the same lowered pressure as the front chamber 14.

When the booster is in the position of rest, the three-way valve 40 allows communication between the front chamber 14 and the working chamber 16 via the ducts 42 and 44, the control chamber 50 being isolated from these two chambers 14 and 16 and subject to the lowered pressure of the source of low pressure V. As was seen earlier, when the driver of the vehicle depresses the brake pedal, the three-way valve 40 first of all breaks communication between the front chamber 14 and the rear working chamber 16, then makes the annular space around the operating rod 34 communicate with the rear chamber 16, and this thus creates a pressure difference across the moving partition 12, resulting in a boost force.

As the pressure in the rear chamber 16 is higher than the pressure in the third chamber 50, which is constant and equal to the pressure provided by the source of partial vacuum V, this means that the second moving partition 54 is subject to the same pressure difference and that it is therefore urged rearwards until it rests against the rear wall 52 of the booster, which then behaves exactly like a conventional booster, the rear tubular part 28 of the pneumatic piston 20 sliding in the annular seals 29 and 57.

When the driver wishes to end his braking action, he releases his effort on the brake pedal, which has the effect of making the plunger 32 move back, and of operating the three-way valve 40 to break the communication between the atmosphere and the rear chamber 16, then of placing the latter in communication with the front chamber 14. The pressures in these two chambers 14 and 16 can therefore equalize so that the booster returns to the position of rest depicted in the upper half of the single FIGURE.

When the detection assembly 70 commands operation in automatic braking mode, it switches the solenoid valve 68 to make it place the atmosphere A in communication with the pipe 66, and therefore with the control chamber 50.

If, at this moment, the booster is in a position of rest, the pressure in the working chamber 16 is the one provided by the source of low pressure V to the front chamber 14 and communicated via the ducts 42 and 44. Thus, the second moving partition 54 is subject to the difference in pressures in the chambers 16 and 50, this pressure difference being exerted across its two faces, and generating a forwards-directed force on this moving partition 54.

The second moving partition therefore moves forwards, carrying the first moving partition 12 along with it by means of a shoulder 72 formed on the pneumatic piston 20 at the front of the rear tubular part 28. The first moving partition 12 then in turn carries along with it the push rod 38 which operates the master cylinder and causes an increase in pressure in the hydraulic circuit connecting this master cylinder to the wheel brakes, thus bringing about the desired automatic braking action.

When the detection assembly 70 commands the cessation of operation in automatic braking mode, it switches the solenoid valve 68 so that it places the source of partial vacuum V in communication with the duct 66, and therefore with the control chamber 50. The second moving partition 54 therefore no longer exerts any force on the first moving partition 12, which from then on is subject only to the action of the spring 30, which brings the two moving partitions 12 and 54 back to the rear position of rest depicted in the single FIGURE.

If, at this moment, the booster is operating, that is to say if the driver of the vehicle is already in the process of braking, the pressure in the rear chamber 16 is then somewhere between the partial vacuum in the front chamber 14 and the atmospheric pressure in the annular volume around the operating rod 34, and the first moving partition 12 is away from the second moving partition 54 by an amount which is proportional to the braking effort applied to the brake pedal, as was already explained earlier.

Letting air at atmospheric pressure into the control chamber 50 has the effect, as before, of creating on the second moving partition 54, a forwards-directed force. The second moving partition 54 therefore moves forwards, sliding over the rear tubular part 28 of the pneumatic piston 20, via the seal 57.

During this movement, the second moving partition 54 compresses the volume lying between it and the first moving partition 12, thus causing a slight increase in the pressure difference exerted across the two faces of the first moving partition 12 and so causing a slight forwards movement of the latter.

If the pressure in the working chamber 16 rises to a value below atmospheric pressure in the control chamber 50, then the movement of the second moving partition 54 continues until this partition comes to rest against the shoulder 72 of the pneumatic piston 20, the two moving partitions then moving forwards resting one against the other, thus providing maximum boost force.

If the pressure in the working chamber 16 rises to a value equal to atmospheric pressure in the control chamber 50, then the movement of the second moving partition 54 with respect to the first moving partition 12 is interrupted at a predetermined distance from the shoulder 72 of the pneumatic piston 20, the two moving partitions then moving forwards in convoy, still providing maximum boost force.

When the detection assembly 70 commands cessation of the operation in automatic braking mode, it switches the solenoid valve 68 so that the source of partial vacuum V is placed in communication with the duct 66 and therefore with the control chamber 50.

The second moving partition 54 is then subject to a rearwards-directed force resulting from the pressure difference exerted across the two faces, the rear face being subject to the low pressure provided by the source V and the front face being subject to the intermediate pressure that there was in the working chamber 16 before the detection assembly 70 commanded operation in automatic braking mode. The second moving partition 54 therefore returns to its rear position of rest, sliding over the rear tubular part 28 of the pneumatic piston 20.

The boost force provided by the booster therefore resumes the value it had before this operation, and which was proportional to the force exerted by the driver on the brake pedal.

It can therefore be seen that irrespective of the position that the three-way valve 40 occupied when the solenoid valve 68 was switched, the boost force provided by the booster quickly becomes established at a value equal to the maximum boost force needed for operation in automatic braking mode. What happens in an operating mode of this kind is that atmospheric pressure is transmitted to the control chamber 50 or evacuated from this chamber directly by the solenoid valve 68 without encountering any other obstacles. The pressure inside the control chamber 50 can therefore increase and decrease very quickly, thus giving a minimum response time both for braking and for brake release.

Depicted in the lower half of the single FIGURE is an alternative form of the embodiment which has just been described, in which the elements which are identical or equivalent to those which have just been described have the same reference symbols, possibly with a "prime" added.

In this alternative form, the second moving partition 54' comprises a rigid disc 56', also capable of sliding in leaktight fashion, thanks to the annular seal 57, over the rear tubular part 28 of the pneumatic system 20. The rigid disc 56' has a small diameter, especially a diameter smaller than that of the disc 56 described earlier, and for example equal to about half the diameter of the disc 56.

The rigid disc 56' is associated with a second semi-rigid deformable membrane 58' equipped on its outer periphery with an annular lip 74. More specifically, the membrane 58' is held by the disc 56' across the entire flat rear surface thereof, this surface being delimited by the outer peripheral edge 55'. Beyond this edge 55', the membrane 58' adopts a frustoconical shape, of axis X–X', the small base of which is delimited by the edge 55' of the disc 56' and the large base of which is delimited by the annular lip 74.

The membrane 58' can adopt a number of positions depending on the operating conditions. In its position of rest, the membrane 58' is in a first position, referenced I, resting against the rear wall 52' of the booster.

Like in the previous embodiment, in this position of rest, the moving partition 54' divides the rear chamber of the booster into a working chamber 16 delimited between the two moving partitions 12 and 54', and into which the radial duct 44 opens, and a control chamber 50', delimited by the second moving partition 54' and the rear wall 52' of the booster.

The way in which the booster produced according to this alternative form operates is identical to the operation already described earlier. In normal operating phases, that is to say where automatic brake control is not active, the third chamber 50 is permanently held at the same lowered pressure as the front chamber 14.

When the driver of the vehicle depresses the brake pedal, the three-way valve 40 first of all breaks the communication between the front chamber 14 and the working rear chamber 16, then makes the annular space around the operating rod 34 communicate with the rear chamber 16. The pressure difference thus created acts, on the one hand, across the first moving partition 12 to generate the brake-boosting force, and, on the other hand, acts across the second moving partition 54' to make absolutely certain that it is resting against the rear wall 52' of the booster, in its position of rest.

Now, as the pressure in the rear chamber 16 is higher than the pressure in the third chamber 50', which is constant and equal to the pressure provided by the source of partial vacuum V, this means that the second moving partition 54' is subject to the same pressure difference and that it is therefore urged rearwards to rest against the rear wall 52' of the booster. The latter again behaves like a conventional booster, the rear tubular part 28 of the pneumatic piston 20 sliding in the annular seals 29 and 57, the second moving partition 54' remaining stationary.

When the detection assembly 70 commands operation in automatic braking mode, it switches the solenoid valve 68 to make it place the atmosphere A in communication with the duct 66 and therefore with the control chamber 50'.

If, at this moment, the booster is in a position of rest, the pressure in the working chamber 16 is that provided by the source of low pressure V. The second membrane 58' is then subject to the difference in pressures in the chambers 16 and 50', exerted across its two faces, and this generates a forwards-directed force on this second membrane 58'.

The second membrane 58' therefore deforms and adopts the second position, referenced II, the annular lip moving forwards and abruptly coming to rest against the first moving partition 12, like a Belleville washer. At this moment, the pressure in the control chamber 50' can increase, which means that, like in the previous embodiment, the second moving partition 54' carries the first moving partition 12 along with it thanks to the shoulder 72 of the pneumatic piston 20, and this causes the master cylinder M to be operated and an increase in pressure in the hydraulic circuit connecting this master cylinder with the wheel brakes.

When the detection assembly 70 commands cessation of operation in automatic braking mode, it switches the solenoid valve 68 to make it place the source of partial vacuum V in communication with the duct 66 and therefore with the control chamber 50'. The action of the spring 30 then becomes predominant and returns the two moving partitions 12 and 54' to their rear position of rest, the second moving partition then switching from position II to position I, the booster thus reverting to the configuration depicted in the lower half of the single FIGURE.

If, at this moment, the booster is operating, that is to say the pressure in the rear chamber 16 is somewhere between the partial vacuum in the front chamber 14 and atmospheric pressure, with the first moving partition 12 away from the second moving partition 54 by an amount proportional to the brake effort applied to the brake pedal, then letting air at atmospheric pressure into the control chamber 50', like before, has the effect of creating forwards-directed force on the second moving partition 54'.

The second membrane 58' therefore deforms and adopts a position in which the annular lip 74 moves forwards and comes to rest against the first moving partition 12, which is in a forwards position with respect to the disc 56', therefore adopting a frustoconical configuration with a vertex half-angle that is smaller than the one it has when it is in the position referenced II. At this instant, the control chamber 50' finds itself isolated from the working chamber 16 and pressure can become established therein at a value equal to atmospheric pressure. The result of this, then, is that, like in the previous embodiment, the second moving partition 54' can move forwards towards the first moving partition 12, the lip 74 sliding over the latter to return to the position referenced II.

The second moving partition 54' then comes to rest against the shoulder 72 of the pneumatic piston 20 and it carries the first moving partition 12 along with it, which causes the master cylinder M to be operated and an increase in pressure in the hydraulic circuit connecting this master cylinder to the wheel brakes.

As was seen earlier, during this movement, the second moving partition 54' compresses the volume lying between it and the first moving partition 12, thus causing a slight increase in the pressure difference exerted across the two faces of the first moving partition 12 and thus causing a slight forwards movement of the latter.

If the pressure in the working chamber 16 rises to a value equal to the atmospheric pressure in the control chamber 50', then the movement of the second moving partition 54' with respect to the first moving partition 12 is interrupted at a predetermined distance away from the shoulder 72 of the pneumatic piston 20, the two moving partitions then moving forwards in convoy, still providing maximum boost force.

When the detection assembly 70 commands cessation of operation in automatic braking mode, it switches the solenoid valve 68 to make it place the source of partial vacuum V in communication with the duct 66, and therefore with the control chamber 50'.

The second membrane 58' is therefore subject to a rearwards-directed force resulting from the pressure difference exerted across its two faces, the rear face being subject to the low pressure provided by the source V, and the front face being subject to the intermediate pressure that there was in the working chamber 16 before the detection assembly 70 commanded operation in automatic braking mode. The lip 74 of the second membrane 58' then comes back to rest on the rear wall 52' of the booster and resumes its rear position of rest, sliding over the rear tubular part 28 of the pneumatic piston 20.

Here too, it can be seen that irrespective of the position that the three-way valve 40 occupies when the solenoid valve 68 is switched, the boost force provided by the booster is quickly established at a value equal to the maximum boost force needed for operation in automatic braking mode. What happens in this alternative embodiment, just like in the embodiment described earlier, is that atmospheric pressure is transmitted to the control chamber 50' or evacuated from this chamber directly by the solenoid valve 68, without encountering any other obstacles. The pressure inside the control chamber 50' can therefore increase and decrease very quickly, thus giving a minimum response time both for braking and for brake release.

A particular advantage of this alternative embodiment lies in the fact that it is no longer necessary to have the two crimped joins between the three parts of the booster casing, and that, what is more, it is possible to use a conventional booster rear wall modified only by the addition of the external duct 66.

Thus a pneumatic booster has indeed been achieved which makes operation in automatic braking mode possible irrespective of whether or not the booster is in the position of rest and in which the response time upon operation in automatic braking mode or upon brake release following automatic braking is reduced to a minimum value because air at atmospheric pressure is let into the control chamber without encountering any obstacles other than the obstacles of the pneumatic solenoid valve 68. A booster of this kind can be obtained making just a minimum number of modifications to a conventional booster, which means that the maximum possible number of conventionally-designed components can be used without these having to be re-designed. The performance of the booster is therefore not adversely affected by these modifications, and the booster is therefore reliable in all circumstances.

Of course, the present invention is not restricted to the embodiment which was described but can, on the contrary, be altered in many ways which will be obvious to those skilled in the art. Thus, for example, the invention can be applied with equal ease to single boosters as depicted or to tandem boosters or boosters with additional chambers. It can also be applied to boosters equipped with a reaction disc as depicted or to boosters with hydraulic, mechanical or pneumatic reaction.

What is claimed is:

1. A pneumatic brake-booster comprising a rigid casing having a rear wall and a front wall which is divided in leaktight fashion by at least a first moving partition structure into at least a one front chamber and a one rear chamber, said front chamber being permanently connected to a source of low pressure with said rear chamber being connected selectively to said front chamber and a source of high pressure by a three-way valve means, said three-way valve being operated by an operating rod secured to a plunger, said first moving partition structure being secured to a pneumatic piston which slides in leaktight fashion in an opening in said rear wall of said casing of the booster, said three-way valve means controlling the communication between a first passage connected to said front chamber, a second passage connected to said rear chamber, and said source of high pressure, said first passage and said second passage being formed in said pneumatic piston, a three-way and two-position solenoid valve having a first inlet being connected to said source of low pressure, a second inlet connected to said source of high pressure and an outlet connected to said rear chamber of said booster, said booster having a second moving partition structure arranged between said first moving partition structure and said rear wall independent of said first moving partition structure, said second moving partition structure dividing said rear chamber into a working chamber delimited by said first moving partition structure and said second moving partition structure and a control chamber delimited by said second moving partition structure and said rear wall, said first passage of the pneumatic piston opening into said front chamber and said second passage of said pneumatic piston opening into the working chamber, said outlet of the solenoid valve being connected to a duct opening into said control chamber, said pneumatic piston passing through the second moving partition structure so that it can freely slide in a leaktight manner through said second moving partition structure, said pneumatic piston having a stop which engages said second moving partition structure to carry and move said pneumatic piston when said second moving partition moves in a forward direction, said second moving partition structure being characterized by a rigid disc having a small diameter and a deformable annular membrane mounted on the rigid disc, said annular membrane being elastically deformed between a first configuration, in a rest position when an outlet of said solenoid valve is connected to said source of low pressure, and a second configuration when said outlet of said solenoid valve allows communication of said source of high pressure to said control chamber, said annular membrane in said second configuration coming to rest against said first moving partition structure.

2. The pneumatic booster according to claim 1, characterized in that said deformable annular membrane is equipped on its outer periphery with an annular lip capable of interacting in leaktight fashion with said rear wall of said casing in said first configuration and with said first moving partition structure in said second configuration.

3. The pneumatic booster according to claim 1, characterized in that said diameter of said rigid disc of said second moving partition structure is equal to approximately half the diameter of said first moving partition structure.

* * * * *